(12) United States Patent
Formoza et al.

(10) Patent No.: US 12,240,532 B2
(45) Date of Patent: Mar. 4, 2025

(54) FOLDABLE VEHICLE

(71) Applicant: City Transformer Ltd., Kfar Netter (IL)

(72) Inventors: Asaf Formoza, Tel Aviv (IL); Udi Meridor, Giv'atayim (IL); Oran Levintant, Gedera (IL); Ani Dwilanski, Tel Aviv (IL)

(73) Assignee: City Transformer Ltd., Tel-Aviv (IL)

( * ) Notice: Subject to any disclaimer, the term of this patent is extended or adjusted under 35 U.S.C. 154(b) by 0 days.

(21) Appl. No.: 18/113,038

(22) Filed: Feb. 22, 2023

(65) Prior Publication Data
US 2023/0192198 A1 Jun. 22, 2023

Related U.S. Application Data

(62) Division of application No. 17/370,063, filed on Jul. 8, 2021, now Pat. No. 11,661,117.

(51) Int. Cl.
*B62D 31/00* (2006.01)
*B62D 3/02* (2006.01)

(52) U.S. Cl.
CPC .............. *B62D 31/006* (2013.01); *B62D 3/02* (2013.01)

(58) Field of Classification Search
CPC ......... B62D 21/14; B62D 3/02; B62D 31/006
See application file for complete search history.

(56) References Cited

U.S. PATENT DOCUMENTS

| | | | |
|---|---|---|---|
| 243,216 A | 6/1881 | Conner | |
| 2,778,655 A | 1/1957 | Hautzenroeder | |
| 3,782,491 A | 1/1974 | Herbenar | |
| 3,820,615 A | 6/1974 | Bobard | |
| 4,109,747 A | 8/1978 | John et al. | |
| 4,350,222 A | 9/1982 | Martin et al. | |
| 4,902,028 A | 2/1990 | Serizawa et al. | |
| 5,489,114 A | 2/1996 | Wayne et al. | |
| 6,371,243 B1 | 4/2002 | James et al. | |
| 6,827,176 B2 | 12/2004 | Andrew et al. | |
| 7,216,896 B1 | 5/2007 | James et al. | |
| 7,717,210 B2 | 5/2010 | Graham et al. | |

(Continued)

FOREIGN PATENT DOCUMENTS

| AU | 2003204443 | 8/2003 |
|---|---|---|
| CA | 2284417 | 3/2001 |

(Continued)

OTHER PUBLICATIONS

Additional Search Fees report for PCT Application No. PCT/IL2022/050528 dated Aug. 16, 2022.

(Continued)

*Primary Examiner* — Paul N Dickson
*Assistant Examiner* — Maxwell L Meshaka
(74) *Attorney, Agent, or Firm* — PEARL COHEN ZEDEK LATZER BARATZ LLP

(57) ABSTRACT

A foldable vehicle may include a chassis comprising a static support, a dynamic chassis frame that includes at least two substantially opposite frame parts and a folding mechanism for decreasing or increasing a distance between the at least two substantially opposite frame parts across a lateral axis of the vehicle between a folded state and an unfolded state; and a controller to control the folding mechanism.

3 Claims, 8 Drawing Sheets

(56) References Cited

U.S. PATENT DOCUMENTS

| | | | |
|---|---|---|---|
| 7,780,197 B2 | 8/2010 | White | |
| 7,832,741 B2 | 11/2010 | Donaldson | |
| 7,954,583 B2 | 6/2011 | Bruce et al. | |
| 7,963,361 B2 | 6/2011 | Bruce et al. | |
| 8,746,388 B2 | 6/2014 | Budweil | |
| 8,894,088 B2 * | 11/2014 | Lark, Jr. | B62D 21/14 280/639 |
| 9,033,089 B2 * | 5/2015 | Theodore | B62D 31/006 280/278 |
| 9,205,881 B2 | 12/2015 | Cedar et al. | |
| 9,434,412 B2 | 9/2016 | Brian et al. | |
| 9,440,686 B2 * | 9/2016 | Theodore | B62D 31/006 |
| 9,440,687 B2 * | 9/2016 | Theodore | B62D 31/006 |
| 9,499,215 B2 * | 11/2016 | Theodore | B62K 15/006 |
| 9,636,949 B2 | 5/2017 | Jong | |
| 9,930,821 B2 | 4/2018 | Jimmie et al. | |
| 9,968,023 B2 | 5/2018 | Nathan et al. | |
| 10,603,955 B2 * | 3/2020 | Abramov | B60B 35/10 |
| 10,730,579 B2 * | 8/2020 | Chang | B62K 5/01 |
| 11,661,117 B2 * | 5/2023 | Formoza | B62D 21/14 180/208 |
| 11,927,968 B2 * | 3/2024 | Krog | G05D 1/0212 |
| 2002/0046896 A1 | 4/2002 | Takayanagi et al. | |
| 2004/0129491 A1 | 7/2004 | Andrew et al. | |
| 2005/0072621 A1 | 4/2005 | Hara et al. | |
| 2008/0190682 A1 | 8/2008 | Mahy et al. | |
| 2009/0206567 A1 | 8/2009 | Donaldson | |
| 2012/0029771 A1 | 2/2012 | Mackin et al. | |
| 2013/0062133 A1 * | 3/2013 | Budweil | B60B 35/1063 180/209 |
| 2013/0154212 A1 | 6/2013 | Vandergon et al. | |
| 2014/0008897 A1 | 1/2014 | Tsukerman et al. | |
| 2014/0202780 A1 * | 7/2014 | Lark, Jr. | B62D 21/14 280/149.2 |
| 2014/0360796 A1 * | 12/2014 | Theodore | B62K 15/006 180/208 |
| 2014/0361515 A1 * | 12/2014 | Theodore | B62K 15/006 280/639 |
| 2014/0361516 A1 * | 12/2014 | Theodore | B62D 31/006 280/639 |
| 2014/0361517 A1 * | 12/2014 | Theodore | B62K 15/006 280/639 |
| 2016/0214644 A1 | 7/2016 | Cmich | |
| 2017/0089018 A1 | 3/2017 | Dahm et al. | |
| 2017/0305190 A1 | 10/2017 | Abramov et al. | |
| 2019/0141884 A1 | 5/2019 | Pilney et al. | |
| 2020/0156727 A1 * | 5/2020 | Chang | B62J 1/08 |
| 2023/0009112 A1 * | 1/2023 | Formoza | B62D 31/006 |
| 2023/0112003 A1 * | 4/2023 | Krog | A01B 79/005 172/1 |
| 2023/0192198 A1 * | 6/2023 | Formoza | B62D 3/02 180/208 |
| 2024/0109590 A1 * | 4/2024 | Jo | B62D 21/14 |

FOREIGN PATENT DOCUMENTS

| | | | | |
|---|---|---|---|---|
| CN | 111114619 | | 5/2020 | |
| CN | 114104103 A | * | 3/2022 | |
| DE | 19756307 | | 6/1999 | |
| DE | 19933052 | | 11/2000 | |
| EP | 2050423 | | 4/2009 | |
| GB | 2510334 A | * | 8/2014 | A61G 5/046 |
| GB | 2594598 A | * | 11/2021 | B62D 21/14 |
| JP | 4043502 U | | 4/1992 | |
| JP | 2003327136 | | 11/2003 | |
| JP | 2006264510 | | 10/2006 | |
| JP | 2013212734 | | 10/2013 | |
| KR | 20130030655 | | 3/2013 | |
| KR | 20140140354 A | * | 12/2014 | |
| KR | 20220105479 A | * | 7/2022 | |
| WO | WO2005056308 | | 6/2005 | |
| WO | WO2011144574 | | 11/2011 | |

OTHER PUBLICATIONS

International Search Report for PCT application No. PCT/IL2022/050528 dated Nov. 16, 2022.

Non Final Office Action for U.S. Appl. No. 17/370,063 dated Aug. 26, 2022.

* cited by examiner

FOLDABLE VEHICLE

CROSS REFERENCE OF RELATED APPLICATIONS

The present application is a divisional application of U.S. patent application Ser. No. 17/370,063, filed on Jul. 8, 2021, which is incorporated herein by reference in its entirety.

FIELD OF THE INVENTION

The present invention relates to vehicles. More particularly, the present invention relates to a foldable vehicle.

BACKGROUND OF THE INVENTION

As the number of vehicles per a mile of road is growing each year due to an increase in demand, congestion and parking problems, especially in urban areas and big cities, where the population density is high, increases to. Public transport is an alternative to private vehicles, but it has its shortcomings, such as insufficient rural area coverage, availability, comfort and more. Other alternatives such as personal vehicles (e.g. mini cars or motorcycles) have a smaller footprint on the road and in the parking but pose a risk in terms of safety. The stability of a vehicle may correlate to the width of that vehicle, a narrower vehicle typically means a higher center of gravity, rendering that vehicle more susceptible to driving conditions, especially in higher velocities. Even though small vehicles are economical in terms of costs (e.g., price, gasoline and parking space), the risks associated with driving small vehicles might overcome the benefits.

Vehicles with adjustable width were introduced, offering comfort and safety while in an expanded state, as well as easy parking on narrow available spaces.

A classic steering system typically turns the wheels at an angle by turning the wheel (e.g., with a wheel column) that is coupled to the wheel shaft. The wheel shaft is typically linked to the wheels (e.g., usually the front wheels) via a steering rack. The steering systems of vehicles with adjustable width may require redesigning to comply with the changing distance between the wheels.

Vehicles with adjustable dimensions (e.g., width, height, or length) may also require a designated controller. The controller may need to be adapted to control the various elements involved in the width adjustment of the vehicle. The controller may need to address various situations and risks linked to the adjustment of the width of the vehicle.

It may be desired to provide a vehicle that is easily and efficiently foldable to allow parking in narrow parking spaces. It may also be desired to provide a steering assembly that is adapted to narrow down or widen up to comply with adjustable distance between the wheels. It may also be desired to provide a controller that is configured to control a foldable vehicle safely.

SUMMARY OF THE INVENTION

There is thus provided, in accordance with an embodiment of the invention, a foldable vehicle that includes a chassis comprising a static support, a dynamic chassis frame linked to the static support that includes at least two substantially opposite frame parts and a folding mechanism for decreasing or increasing a distance between the at least two substantially opposite frame parts across a lateral axis of the vehicle between a folded state and an unfolded state; and a controller to control the folding mechanism.

According to some embodiments of the invention, the folding mechanism includes at least one carousel connected to at least one of the frame parts.

According to some embodiments of the invention, the at least one carousel is connected to the static support and pivots about an axis orthogonal to the static support.

According to some embodiments of the invention, the at least one carousel is positioned at a substantially equal distance from the two frame parts.

According to some embodiments of the invention, the folding mechanism comprises one or a plurality of pistons connected to the static support, the pistons are configured to drive the at least one carousel.

According to some embodiments of the invention, the frame parts retract to the static support in the folded state.

According to some embodiments of the invention, the chassis comprises one or a plurality of tracks, the at least two frame parts slide along the tracks between the folded state and the unfolded state.

According to some embodiments of the invention, the foldable vehicle further comprises a locking mechanism to lock the at least two substantially opposite frame parts in a state that is selected from the group of states consisting of the unfolded state, the folded state and an intermediate state.

According to some embodiments of the invention, the foldable vehicle further comprises a split steering mechanism comprising a gearbox connectable to a steering wheel by a steering column; and two shafts, a first shaft of the two shafts for linking the gearbox to a first front wheels of a vehicle, and a second shaft of the two shafts for linking the gearbox to a second front wheel of the vehicle; wherein the gearbox is configured to transmit and split rotation of the steering column to rotation of the shafts, so that the rotation of each of the shafts correlates to the rotation of the steering column.

According to some embodiments of the invention, the split steering mechanism comprises extendable shafts that extend and retract with the decreasing or increasing of the distance between the two frame parts of the foldable vehicle.

According to some embodiments of the invention, the split steering mechanism is configured to keep a turn angle of front wheels of the foldable vehicle during the decreasing or increasing of the distance between the two frame parts of the foldable vehicle.

According to some embodiments of the invention, the split steering mechanism comprises extendable shafts that extend and retract with the decreasing or increasing of a height of the foldable vehicle.

According to some embodiments of the invention, the split steering mechanism is configured to keep a turn angle of front wheels of the foldable vehicle during the decreasing or increasing of a height of the foldable vehicle.

According to some embodiments of the invention, the foldable vehicle further comprises one or more sensors located on the vehicle for sensing parameters associated with assessing risk to the vehicle.

There is thus provided, in accordance with an embodiment of the invention, a method for controlling folding and unfolding of a foldable vehicle using a controller, the method includes using the controller, receiving a folding or unfolding command; using the controller, obtaining sensed data from one or more sensors located on the vehicle for sensing parameters associated with assessing risk to the vehicle; using the controller, assessing the risk; using the controller, checking whether the risk is below a threshold;

using the controller, commencing the folding or unfolding if the risk is below a threshold; and using the controller, checking whether the folding or unfolding is complete.

According to some embodiments of the invention, the method further includes suspending the folding or unfolding of the foldable vehicle if the risk is not below a threshold.

According to some embodiments of the invention, the method further includes, after suspending the folding or unfolding, obtaining sensed data from the one or more sensors, assessing the risk and checking whether the risk is below a threshold.

According to some embodiments of the invention, the method further includes if the folding or unfolding is not complete, obtaining sensed data from the one or more sensors, assessing the risk and checking whether the risk is below a threshold until the folding or unfolding is complete.

According to some embodiments of the invention, the method further includes suspending the folding or unfolding of the foldable vehicle if the risk is not below a threshold.

According to some embodiments of the invention, the method further includes after suspending the folding or unfolding, obtaining sensed data from the one or more sensors, assessing the risk and checking whether the risk is below a threshold.

According to some embodiments of the invention, the method further includes limiting speed of the foldable vehicle if the foldable vehicle is in the folded state.

According to some embodiments of the invention, the method further includes, using the controller, autonomously generating a folding or unfolding command.

According to some embodiments of the invention, the method further includes, using the controller, resolving conflicts between received commands of folding or unfolding.

There is thus provided, in accordance with an embodiment of the invention, a split steering mechanism that includes a gearbox connectable to a steering wheel by a steering column; and two shafts, a first shaft of the two shafts for linking the gearbox to a first front wheels of a vehicle, and a second shaft of the two shafts for linking the gearbox to a second front wheel of the vehicle; wherein the gearbox is configured to transmit and split rotation of the steering column to rotation of the shafts, so that the rotation of each of the shafts correlates to the rotation of the steering column.

According to some embodiments of the invention, wherein each of the shafts has a varying length.

According to some embodiments of the invention, the split steering mechanism is configured to facilitate concurrent different lengths of the shafts.

According to some embodiments of the invention, the split steering mechanism is configured to apply Ackerman correction when turning the front wheels.

BRIEF DESCRIPTION OF THE DRAWINGS

In order for the present invention to be better understood and for its practical applications to be appreciated, the following Figures are provided and referenced hereafter. It should be noted that the Figures are given as examples only and in no way limit the scope of the invention. Like components are denoted by like reference numerals.

DETAILED DESCRIPTION OF THE INVENTION

Figure 1A:
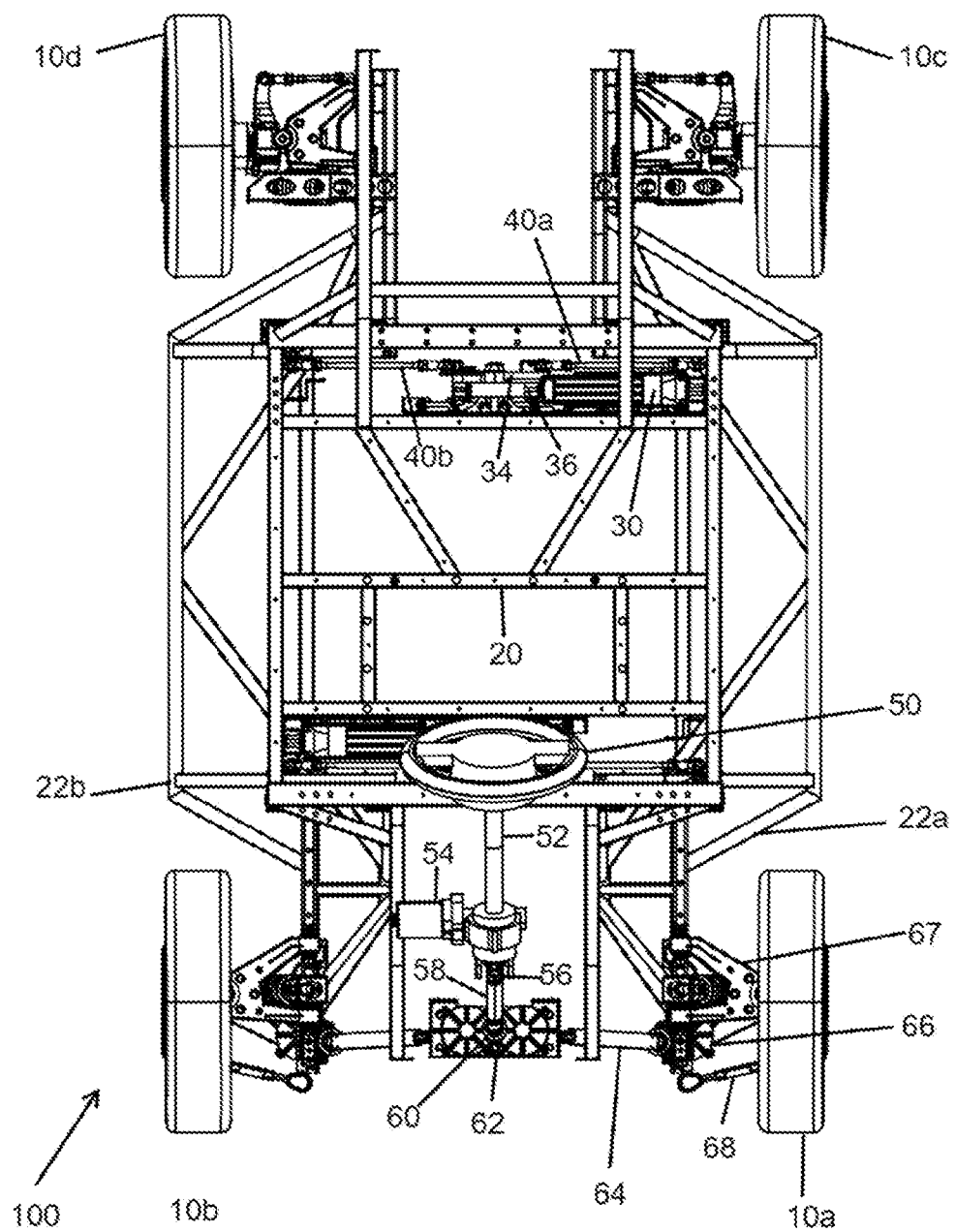
FIG. 1A is a top view of a chassis of a foldable vehicle in an unfolded state, in accordance with some embodiments of the present invention.

In the following detailed description, numerous specific details are set forth in order to provide a thorough understanding of the invention. However, it will be understood by those of ordinary skill in the art that the invention may be practiced without these specific details. In other instances, well-known methods, procedures, components, modules, units and/or circuits have not been described in detail so as not to obscure the invention.

Although embodiments of the invention are not limited in this regard, discussions utilizing terms such as, for example, "processing," "computing." "calculating," "determining." "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium (e.g., a memory) that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, the conjunction "or" as used herein is to be understood as inclusive (any or all of the stated options).

A foldable vehicle, according to some embodiments of the present invention, is introduced, which may include systems and mechanisms for adjusting the width of the foldable vehicle and for controlling such adjustment. A foldable vehicle may refer to a vehicle with adjustable width or length, a vehicle with retractable and extendable elements, a vehicle that is not constant in the dimensions thereof and the like, hereinafter foldable vehicle. A foldable vehicle, according to some embodiments of the invention, is configured to folds or unfold, thereby decreasing or increasing the lateral dimension of the vehicle (hereinafter—the width). According to some embodiments of the present invention, increasing or decreasing the width of the vehicle involves decreasing or increasing the distance between opposing wheels (also referred to as left wheel and right wheel). The width of a foldable vehicle may be increased or decreased by increasing or decreasing the distance between opposite parts of the vehicle. For example, a folding mechanism of the foldable vehicle may increase or decrease the distance between two substantially opposite frame parts across a lateral axis of the vehicle between a folded state and an unfolded state. According to some embodiments of the invention, increasing or decreasing the distance between opposite parts of the vehicle may increase or decrease the distance between opposing wheels. Hereinafter decreasing the width of the vehicle is referred to as folding, and to increasing the width of the vehicle is referred to as unfolding.

In some embodiments of the present invention a foldable vehicle or a foldable vehicle may comprise a chassis. The chassis may comprise, a static support, a dynamic chassis frame and a folding mechanism. The dynamic chassis frame may include at least two substantially opposite frame parts. The folding mechanism may decrease or increase a distance between the at least two substantially opposite frame parts across a lateral axis of the vehicle between a folded state and an unfolded state.

A foldable vehicle according to some embodiments of the present invention may be useful in areas where parking space is scarce. Folding the vehicle may decrease the width, thus reducing width of the required parking space for the vehicle to park on. The foldable vehicle may also be easier to maneuver in a narrow road. When the width of a vehicle is decreased, the center of mass of that vehicle is raised higher above the ground, stability of the vehicle may be reduced. When in a folded state, a foldable vehicle, according to some embodiments of the present invention, may be driven at low speeds to avoid overturning. For example, in the folded state, a controller of the foldable vehicle may limit the driving speed of the foldable vehicle. According to some embodiments of the present invention, the foldable vehicle may unfold gradually during a drive, in order to maintain stability of the foldable vehicle (e.g., depending on parameters such as velocity, road conditions, weight of the vehicle, turning radius, etc.).

Driving a foldable vehicle, according to some embodiments of the present invention, at speeds above a predetermined threshold speed may not be recommended, and in some embodiments the foldable vehicle may be configured to avoid speeding above such threshold speed limit, for example, by having a controller of the vehicle prevent driving the vehicle at speeds above the threshold speed limit. When the foldable vehicle is in an unfolded state, the center of mass is lowered and as a result the stability of the vehicle is increased. For example, a foldable vehicle may be in a folded state while parking for saving parking space or for parking at a limited parking space. When the foldable vehicle exits the parking space and starts moving at a low to medium velocities (e.g., velocities up to 40 kilometers per hour) the vehicle may still remain in the unfolded state. According to some embodiments of the present invention, the foldable vehicle may be limited to be driven at speeds below or up to a predetermined threshold speed (e.g., 40 Km/h).

According to some embodiments of the present invention, a folding or unfolding process of the foldable vehicle may be initiated by a user (e.g., the driver) of the foldable vehicle, or automatically in the case of an autonomous foldable vehicle. In some embodiments the folding or unfolding process may be limited to commence and complete only when the vehicle is driving and is traveling at speeds below or up to a predetermined speed. The folding or unfolding process may be controlled by a controller of the foldable vehicle.

In some embodiments of the present invention, the foldable vehicle may include a frame that defines a static support. The static support may be designed to support one or a plurality of seats, and may be a part (e.g., the floor) of a passenger cabin that includes a steering wheel, windshield, one or more walls, one or more windows, one or more doors, a dashboard with various indicators, screens, and other components that are typically part of a dashboard, as well as other components.

In some embodiments of the present invention, the static support may be coupled to a dynamic chassis, for example by connector. The dynamic chassis may include one or more moving frames, parts, structures or assemblies that facilitate the folding and unfolding of the foldable vehicle. In some embodiments of the present invention, the dynamic chassis may include two substantially opposite frame parts coupled to the static support, wherein Each frame of the opposite frames may include or support wheels. For example, the left frame may be linked (e.g., via a suspension) to the left side wheels (e.g., front left wheel back left wheel), whereas the right frame may be linked (e.g., via a suspension) to the right side wheels (e.g., right front wheel, right back wheel). Wheels that are located on the same side (e.g., right or left) of the vehicle are hereinafter referred to as following wheels. In some embodiments of the present invention the dynamic chassis may include a moving frame for each wheel of the foldable vehicle. For example, the dynamic chassis may include four movable frames each supporting a different wheel of the foldable vehicle. The dynamic chassis may include one moving frame, wherein a subset of the wheels may be linked to the static support and the rest of the wheels may be linked to the moving frame.

In some embodiments of the present invention, the foldable vehicle may include one or a plurality of folding mechanisms for facilitating the folding and unfolding of the vehicle. The folding mechanism may include one or a plurality of actuators, drivers, motors, pistons, power trains and driving mechanisms the like, hereinafter referred to as actuators. A folding mechanism, according to some embodiments of the present invention, may be used to couple the static support to the dynamic chassis. The folding mechanism may be configured to apply force on the components of the dynamic chassis so as to pull them closer together or push them apart to a folded state or an unfolded state respectively or an intermediate state therebetween. The width of the vehicle may be increased or decreased by operating the folding mechanism to increase or decrease, respectively, the distance between the frame parts.

The folding mechanism may include tracks, rails, guides, transmission elements, linear transmission elements and the like for transferring the moving parts of dynamic chassis to and between the folded state and the unfolded state. Tracks may be used to guide the moving parts along a predetermined path, and maintain the moving parts substantially parallel and opposite each other. The tracks may include sliding elements, bearings, linear bearings, magnets, lubricating materials and the like. Tracks may be provided on the static support and/or on the dynamic chassis.

The Dynamic chassis may include moving parts (e.g., substantially opposite frame parts) that fold into, above or below the static support. The dynamic chassis may fold or unfold with respect to the static support along an axis of rotation of the wheels or an axis parallel to the axis of rotation of the wheels.

In some embodiments of the present invention, the foldable vehicle may fold or unfold without changing the overall height of the vehicle. The foldable vehicle may maintain the center of mass of the foldable vehicle, along a vertical axis substantially orthogonal to a plane between front wheels and back wheels of the vehicle, during the folding and unfolding of the foldable vehicle.

In some embodiments of the present invention, the foldable vehicle may include one or a plurality of controllers (hereinafter, for brevity—controller). The foldable vehicle may also include one or a plurality of sensors. For example, the foldable vehicle may include sensors that measure velocity, acceleration, location, temperature, the number and physical location of the passengers in the vehicle, the turning of the wheels, the turning of the steering wheel, distance of the vehicle from objects, the distance between a set of parallel wheels, the distance between the moving parts of the dynamic chassis, and other vehicle and/or travel parameters. The controller may be connected to the sensors, obtain sensed data from said sensors and process the obtained sensed data.

The controller may be configured to control the folding mechanism. The controller may be configured to receive an input to initiate folding or unfolding of the foldable vehicle. For example, a user of the vehicle, such as the driver may initiate a signal to be issued to the controller to fold or unfold the vehicle. For example, the user may press a button, turn on a knob, press a virtual button on a touch screen, use a wireless communication device such as a smartphone and employ another means of user interface to send a signal to the controller to fold or unfold the vehicle.

In some embodiments of the present invention, the foldable vehicle may be autonomous and/or remotely controllable. The controller may automatically generate or may receive a signal to fold or unfold the vehicle from a user, or from a remote device, such as a computer, other controller, a third party device or other remote control device. For example, the controller may receive commands from the autonomous foldable vehicle for folding and unfolding the autonomous foldable vehicle. In some embodiments of the present invention, the controller may receive an unfolding signal (e.g., user initiated) and generate a command signal to the folding mechanism to unfold the vehicle when and only when the receiving sensed data indicating that the vehicle is traveling at a speed below a predetermined speed limit threshold (e.g., 40 Km/h), such as, between a first predetermined speed threshold and a second predetermined speed threshold, which is higher than the first speed threshold and below or same as a predetermined speed limit threshold (e.g., 40 Km/h). In some embodiments, the controller may limit the speed of the foldable vehicle (e.g., by controlling the motor or other part/s of the propulsion system of the vehicle) to remain below or up to the predetermined speed limit threshold until the unfolding process is completed.

In some embodiments of the present invention, the controller may receive or generate a command to partially fold and unfold the foldable vehicle. The foldable vehicle may be configured to have a relation between the speed of the foldable vehicle and the width of the vehicle (e.g., the extent of unfolding). The controller (or a control unit of the autonomous vehicle) may determine the extent of unfolding as a function of speed of the foldable vehicle. During the folding, the controller may limit the speed of the folding vehicle accordingly (e.g., limit the speed of the foldable vehicle as a function of the width of the vehicle). During the folding or the unfolding, the controller may limit or suspend the folding or unfolding according to the speed of the foldable vehicle.

In some embodiments of the present invention, the foldable vehicle may be autonomous. The foldable vehicle may send signals to the controller for controlling the folding and unfolding of the vehicle. The foldable vehicle may receive signals from sensors and autonomously control the foldable vehicle (e.g., control the speed, direction, folding and unfolding of the foldable vehicle).

Similarly, in some embodiments of the present invention, the controller may receive a folding signal (e.g., user initiated) and generate a command signal to the folding mechanism to fold the vehicle when and only when the receiving sensed data indicating that the vehicle is traveling at a speed below a predetermined speed limit threshold (e.g., 40 Km/h), for example.

In some embodiments, the controller may limit the speed of the foldable vehicle (e.g., by controlling the motor or other part/s of the propulsion system of the vehicle) to remain below or up to the predetermined speed limit threshold until the folding process is completed.

In some embodiments of the present invention the controller may use location data (e.g., GPS). The foldable vehicle may use the location data for folding and unfolding the foldable vehicle. For example, the foldable vehicle may detect a parking space in the vicinity of the foldable vehicle, and fold in preparation for parking. The foldable vehicle may use the location data to detect that the foldable vehicle is going into a highway, and unfold in preparation for entering the highway. The foldable vehicle may use location data for detecting areas with narrow roads, as a result the foldable vehicle may fold (e.g., some narrow roads may only allow vehicles with small width).

The controller may be configured to fold and unfold the moving parts of the dynamic chassis in a synchronic and stable manner. For example, the controller may operate the folding mechanism so as to move the two opposing frame parts of the dynamic chassis concurrently and cause these parts to move at the same velocity.

The foldable vehicle may be configured (e.g., by employing a designated controller) to fold and unfold only while moving. The motion of the opposite frame parts during folding and unfolding is along an axis which is substantially perpendicular to the general direction of travel of the vehicle.

For example, the vehicle may be designed to fold and unfold during the movement of the vehicle and within a range of allowed velocities (e.g., between 5.38 Km/h and 40 Km/h). The range of allowed velocities may be predetermined. The range of allowed velocities may be determined according to regulation, safety, manufacturing, business reasons and the like. The range of allowed velocities may be predetermined by a manufacturer of the vehicle and any other authorized body (e.g., government body, regulation body, sales representative). The range of allowed velocities may vary. For example, in some countries the range of allowed velocities may be between 5.38 Km/h and 40 Km/h, in other countries the range of allowed velocities may be between 0 (the vehicle may remain unfolded at very low speeds) and 90 Km/h (the vehicle may remain folded at high speeds). The range of allowed velocities may vary according to driving conditions such as turning radius and speed during a turn. The foldable vehicle may be configured to prevent operation of the folding mechanism to folding or unfold the vehicle when the vehicle is stationary or traveling at very low speeds (e.g., below 5.38 Km/h).

The foldable vehicle may be configured to fold and unfold while traveling along a substantially straight path or when taking a turn (e.g., when the front wheels are turned at an angle sideways). For example, the front wheels may be turned at an angle so as to turn the vehicle to the left or to the right, the vehicle may fold or unfold while the front wheels remain turned at an angle so that the vehicle may maintain its accurate movement during the folding or unfolding. Maintaining the turn angle of the wheels regardless of the folding and unfolding may be applied as a safety measure for the vehicle. For example, when the vehicle is turning, the wheels are turned at an angle in a certain direction, if an unfolding is initiated (e.g., the vehicle is in a turn and the vehicle is accelerating towards high velocities so the unfolding is automatically initiated) and the turn angle is not maintained, the vehicle might change direction during the turn and crash. The foldable vehicle may maintain the turning angle of the foldable vehicle during the folding and unfolding of the foldable vehicle and during normal driving. The foldable vehicle may maintain the turning angle of the foldable vehicle if the folding and unfolding of the foldable vehicle was suspended. For example, if the foldable vehicle suspended the folding of the foldable vehicle, so that the vehicle is between the folded and the unfolded state, the user may maintain control over the steering of the foldable vehicle, and the turning angle of the foldable vehicle may be maintained. In some embodiments of the present invention, during a turn while the foldable vehicle is folding or unfolding, the foldable vehicle may maintain the turn angle of the wheels (e.g., the steering radius) until a user of the vehicle (e.g., driver) does any change (e.g., turns the steering wheel).

In some embodiments of the present invention, the foldable vehicle may prevent acceleration or declaration during the folding and unfolding. Alternatively or additionally, the foldable vehicle may allow acceleration or declaration during the folding and unfolding. For example, the foldable vehicle may accelerate or decelerate during the folding or unfolding within predetermined ranges of acceleration and/or velocities. In some embodiments of the present invention, the user of the vehicle may maintain control on the velocity, acceleration and deceleration (e.g., gas and brake pedals) of the foldable vehicle during the folding and unfolding of the folding of the foldable vehicle. The foldable vehicle may enable the use of the steering wheel to steer the foldable vehicle during the folding and unfolding. In some embodiments of the present invention, during the folding, the foldable vehicle may enable the acceleration (e.g., increasing of speed), if for example, the speed does not exceed a predetermined limit (e.g., according to the width of the vehicle at the moment).

In some embodiments of the present invention, the split steering mechanism may adjust the front wheels for Ackerman correction, which includes adjustment of the turn angle of the front wheels when the car is turning. During a turn, to the left for example, the front left wheel may travel a smaller distance than the front right wheel, Ackerman correction will adjust the turn angle of the front wheels to account for the difference in the traveled distance during a turn of the vehicle. The split steering mechanism may turn the front left wheel at an angle and the front right wheel in a different turn angle to adjust for Ackerman correction. In some embodiments of the invention, the Ackerman correction may be active also during folding and unfolding of the vehicle.

In some embodiments of the present invention, the split steering mechanism may adjust according to a vehicle's width (e.g., folding and unfolding) and/or according to the vehicle's height (e.g., the height of the vehicle may be adjustable and/or changeable). The vehicle may adjust the height of thereof, the split steering mechanism may keep the turn angle of the wheels in different heights of the vehicle. For example, the split steering mechanism may keep the turn angle of the wheels before, during and after a height adjustment of the vehicle or any of the wheels. The split steering mechanism may keep the turn angle of the wheels, while tolerating differences in height between different sides of the vehicle.

In some embodiments of the present invention, the split steering mechanism may adjust the front wheels for Ackerman correction in relation to the height of the vehicle and/or any of the wheels of the vehicle. For example, the split steering mechanism may adjust the front wheels for Ackerman correction if the height of one side of the vehicle is different than another side of the vehicle. The split steering mechanism may adjust the front wheels for Ackerman correction if the height of at least one of the wheels (e.g., one of the front wheels) is different than another wheel (e.g., one wheel is higher and all other wheels are on the same height). For example, the split steering mechanism may adjust the front wheels for Ackerman correction before, during and after a height adjustment of the vehicle or any of the wheels. The split steering mechanism adjust the front wheels for Ackerman correction, while tolerating differences in height between different sides of the vehicle.

FIG. 1A is a top view of a chassis of a foldable vehicle in an unfolded state, in accordance with some embodiments of the present invention. Foldable vehicle 100 may include static support 20. Static support 20 may be rectangular but can also be formed in another form. Static support 20 may have a flat surface to provide for linear displacement of part or parts that are dynamically coupled to static support 20. A driver seat may be mounted on static support 20. Additionally, passenger seat or seats may also be supported by static support 20.

Static support may also include a passenger cabin (not shown in this figure for brevity) that includes a steering wheel 50, windshield, one or more walls, one or more windows, one or more doors, a dashboard with various indicators, screens, and other components that are typically part of a dashboard, as well as other components.

Static support 20 and other parts of foldable vehicle 100 may be assembled from multiple parts. For example, static support 20 may be welded or assembled from a plurality of bars or rods made of metal, metal composite, carbon filer or composite material or other rigid material. Static support 20 and other parts of foldable vehicle 100 (e.g., frame part 22a and frame part 22b) may be manufactured from lightweight material or materials to reduce the weight of the vehicle. For example, static frame 20 may be manufactured from aluminum to enhance weight to strength ratio.

A folding mechanism, according to some embodiments of the present invention, may include one or a plurality of actuators 30. Folding mechanism 31 may include one or more actuators 30. In some embodiments of the present invention, two actuators are provided, located at a front end and at a back end of static support 20. Actuator 30 may be bolted, welded, assembled to, screwed to or mounted on or otherwise coupled to static support 20. In some embodiments of the invention one or a plurality of actuators may be coupled to frame parts 22a and/or 22b. The folding mechanism may be configured to facilitate the folding and unfolding of foldable vehicle 100. The folding mechanism may be configured to move frame parts 22a and 22b along a substantially parallel axis. In some embodiments of the present invention, the parallel axis may be substantially perpendicular to the general direction of travel of the vehicle. For example, the folding mechanism and actuator 30 may be parallel to an axis between the center of the front wheels, so as to pull and push the front wheels along said axis, during the folding and unfolding of foldable vehicle 100.

Actuator 30 may include piston 32. Actuator 30 may drive piston 32 using hydraulics, pneumatics, mechanical drivers, and/or electrical components. Piston 32 may be extend and retracted. For example, piston 32 may be extended fully or partially or retract fully or partially. Piston 32 may be connected to carousel 34 via pivot joint 36. Piston 32 may be welded, assembled to or connect to carousel 34. The linear motion of piston 32 may cause carousel 34 to rotate about an axis of rotation clockwise or anti-clockwise.

Carousel 34 may connect to shafts 40a and 40b through pivot joints 38a and 38b, respectively. Carousel 34 may connect to one or a plurality of shafts. For example, carousel 34 may connect to one or a plurality of moving frame parts. Carousel 34 may apply a pulling or pushing force to the movable frame parts via one or a plurality of shafts. Each of carousels 34 may be positioned along the central longitudinal axis of static base 20 or at another location. For example, a first carousel 34 may be positioned in the middle between the front wheels, and a second carousel 34 may be positioned in the middle between the back wheels. Each carousel 34 may apply symmetrical and opposite forces on the opposite frame parts 22a and 22b so as to reduce or increase the distance between the frame parts. Carousels 34 may be positioned at different locations between frame parts 22a and 22b. For example, a first carousel 34 connected at a distal portion of static frame 20, may be positioned closer to frame part 22a, while a second carousel 34 connected at a proximal portion of static frame 20, may be positioned closer to frame part 22b.

Shafts 40a and 40b may be connected to frame parts 22a and 22b respectively. Shafts 40a and 40b may be of similar or different lengths. For example, if carousel 34 is centered between frame part 22a and 22b, shaft 40a and shaft 40b may connect at opposite locations on frame parts 22a and 22b respectively, wherein shafts 40a and 40 may have similar lengths. For example, if both carousels 34 are placed closer to frame part 22a than to frame part 22b, shafts 40a and 40 may have different lengths as a result. Shafts 40a and 40b may be extendable (e.g., telescopic poles, pistons, adjustable length shafts). Shafts 40a and 40b may vary in length in correlation to the intended maximal extent of the folded and unfolded states. Shafts 40a and 40b may be used to limit the extent of the unfolding and folding of foldable vehicle 100. For example, the length of shafts 40a and 40b may limit how far apart frame parts 22a and 22b can be moved when unfolded. If shafts 40a and 40b are shorter, frame parts 22a and 22b may be allowed to travel a shorter distance between the folded and unfolded states. Is shafts 40a and 40b are longer, frame parts 22a and 22b may be allowed to travel a longer distance between the folded and unfolded states.

Actuator 30 may extend piston 32, causing carousel 34 to rotate. When rotated in one direction, carousel 34 may push shafts 40a and 40b apart. When shafts 40a and 40b are pushed apart, the distance between frames 22a and 22b increases, resulting in unfolding of foldable vehicle 100. When rotated in a second direction opposite to the first direction, carousel 34 may pull shafts 40a and 40b closer. When shafts 40a and 40b are pulled closer, the distance between frames 22a and 22b decreases, resulting in folding of foldable vehicle 100.

Actuator 30 may have a locking mechanism for locking vehicle 100 in a fully unfolded state, a fully folded state and any intermediate state. The folding mechanism may include one or more latches, stoppers, locks, switches, sensors, controllers, limiters and other elements for locking or otherwise limiting the folding mechanism. For example, the folding mechanism may have a stopper for preventing frame parts 22a and 22b from extending or retracting beyond a certain limit to avoid dismantling of the frame parts. According to some embodiments of the present invention, a folding mechanism may include latches for locking frame parts 22a and 22b in the folded state, in the unfolded state and in any intermediate state between the folded the unfolded states. According to some embodiments of the present invention, a folding mechanism may lock foldable vehicle 100 in a fully unfolded state, a fully folded state and any intermediate state electrically (e.g., by controlling how much pistons of the folding mechanism extend and retract).

Vehicle 100 may be propelled by an electric motor, by an internal combustion engine or by hybrid propulsion unit. Vehicle 00 may have front wheels 10a and 10b and back wheels 10c and 10d. Vehicle 100 may have a split steering mechanism. The Split steering mechanism may include steering wheel 50. Steering wheel 50 may be coupled to steering column 52. Steering column 52 may connect to steering assembly 54 (e.g., power steering unit). Steering assembly 54 may include an electric motor and gears for assisting the driver in turning steering wheel 50. Steering assembly 54 and/or steering column 52 may be connected through universal joint 56 to shaft 58. Shaft 58 may convey the turning motion of steering wheel 50 onward to gearbox 62 through universal joint 60. Universal joint 65 may be connected to lever gear 66 with extendable shaft 64. Extendable shaft 64 may extend or retract with the unfolding or folding of the vehicle, respectively. Extendable shaft 64 may maintain the rotation status of the split steering mechanism and in turn the turn angle of the wheels during the unfolding or folding of vehicle 100. Lever gear 66 connects to front wheels 10a and 10b through tie shaft 68.

First suspension 67a and second suspension 67b (shown in FIG. 4) may connect the wheels of the vehicle to the dynamic frames. First suspension 67a and second suspension 67b may define an axis substantially vertical to first suspension 67a and second suspension 67b. Wheel 10a (and other wheels) may pivot about the vertical axis (e.g., when the vehicle turns and the wheels turn angle). Tie shaft 68 may move relatively to frame 22a for turning wheel 10a at an angle, and first suspension 67a (and second suspension 67b) may remain static relatively to frame 22a while wheel 10a is turning at an angle.

Figure 1B:
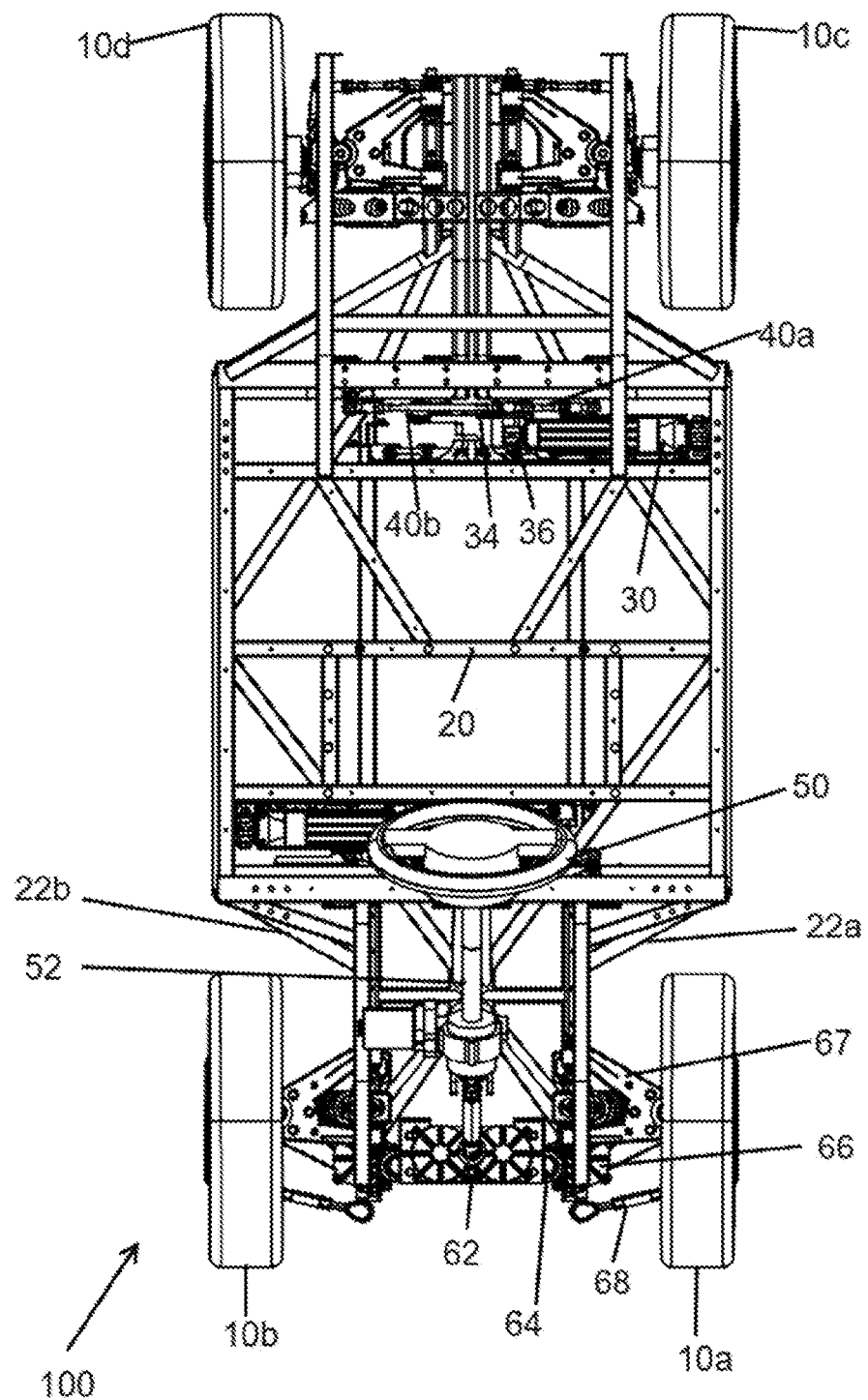
FIG. 1B is a top view of the chassis of the foldable vehicle shown in FIG. 1A, in a folded state.

FIG. 1B is a top view of the chassis of the foldable vehicle shown in FIG. 1A, in a folded state. Foldable vehicle 100 may fold when actuator 30 causes piston 32 to retract. When piston 32 retracts carousel 34 is rotated so as to pull shafts 40a and 40b, and in turn frames 22a and 22b get pulled closer together. Front wheels 10a and 10b may be turned at an angle and may maintain their turn angle during the folding or unfolding of vehicle 100.

In some embodiments of the invention, foldable vehicle 100 may keep the turn angle of front wheels 10a and 10b while adjusting for Ackerman correction of the relative turn angle between wheels 10a and 10b. The split steering mechanism may be used in foldable vehicles and in small vehicles. It may be difficult to implement a steering system in foldable vehicles and small vehicles (e.g., a steering system that adjusts the wheels for Ackerman correction). Typically, a steering system might require space in the front of the vehicle. In small vehicles implementing a typical steering (e.g., with adjustment for Ackerman correction) might be difficult due to design constraints (e.g., placement of pedals and other elements in the front of the vehicle). The Split steering mechanism may adjust for Ackerman correction and vacate space in the front of the vehicle (e.g., pedals).

Figure 2:
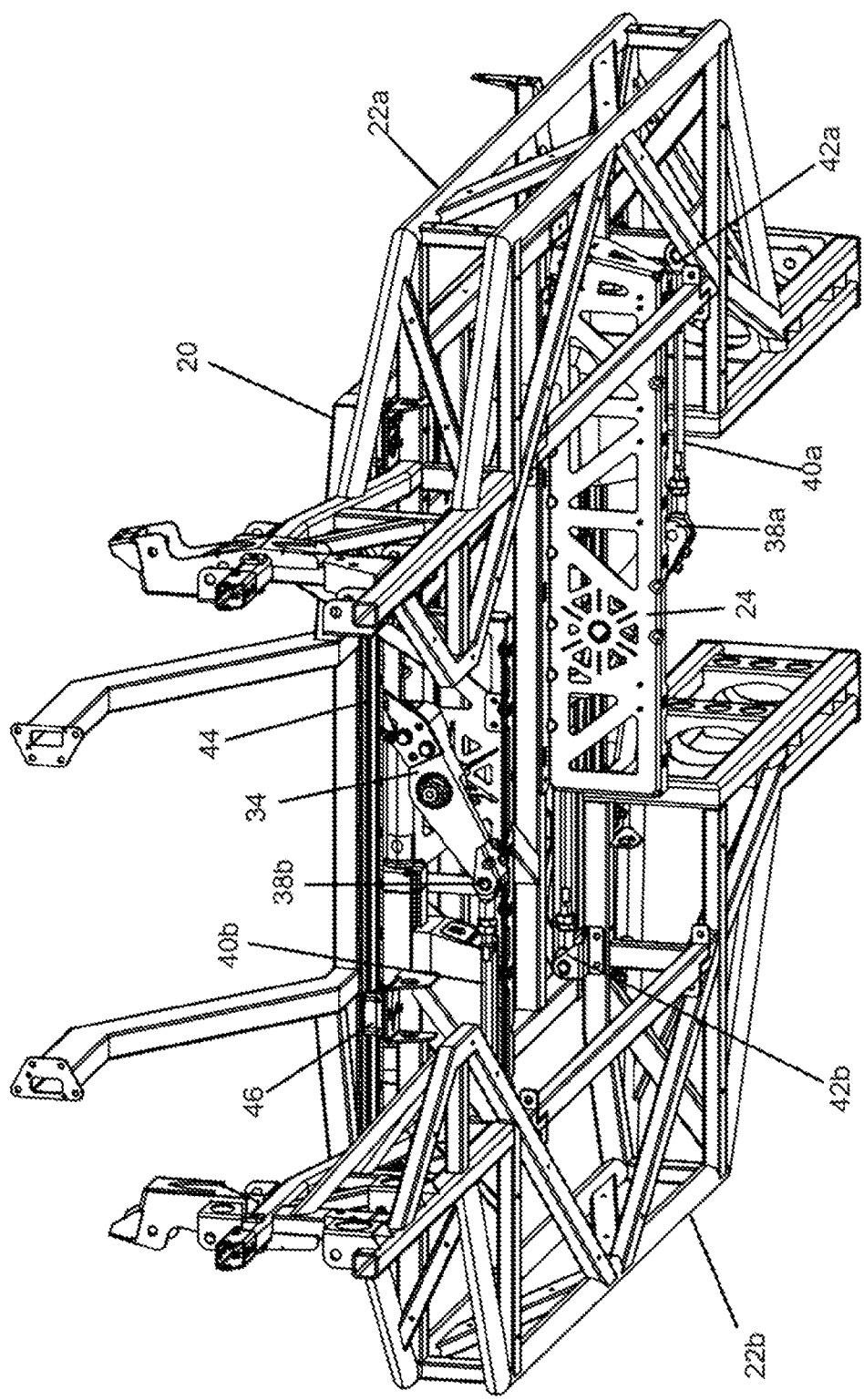
FIG. 2 is a bottom view of a folding mechanism of the chassis of a foldable vehicle, shown in FIG. 1A.

FIG. 2 is a bottom view of a folding mechanism of a foldable vehicle, in accordance with some embodiments of the present invention. Static support 20 may include plate 24 extending laterally across static support 20. Carousel 34 may be pivotally connected to static support 20 on plate 24, so as to be capable of rotating in a place of rotation that is substantially perpendicular to static support 34. Static support 34 may have one, two or more folding assemblies, one folding assembly may be positioned at a proximal end of static support 34 while the other folding assembly may be positioned at a distal end of static support 34 for an efficient and uniform power distribution during the folding and unfolding of dynamic chassis frame part 22a and 22b. In some embodiments of the present invention the folding mechanism may include one, two or more pairs of opposite folding assemblies for a smooth operation to save power and evenly distribute momentum on frame part 22a and 22b of the dynamic chassis.

The folding mechanism may include one or more rails 44 and a plurality of sliding elements 46. Sliding elements 46 may connect to dynamic chassis frame part 22a and 22b so as to facilitate sliding of frame part 22a and 22b along rails 44.

Figure 3:
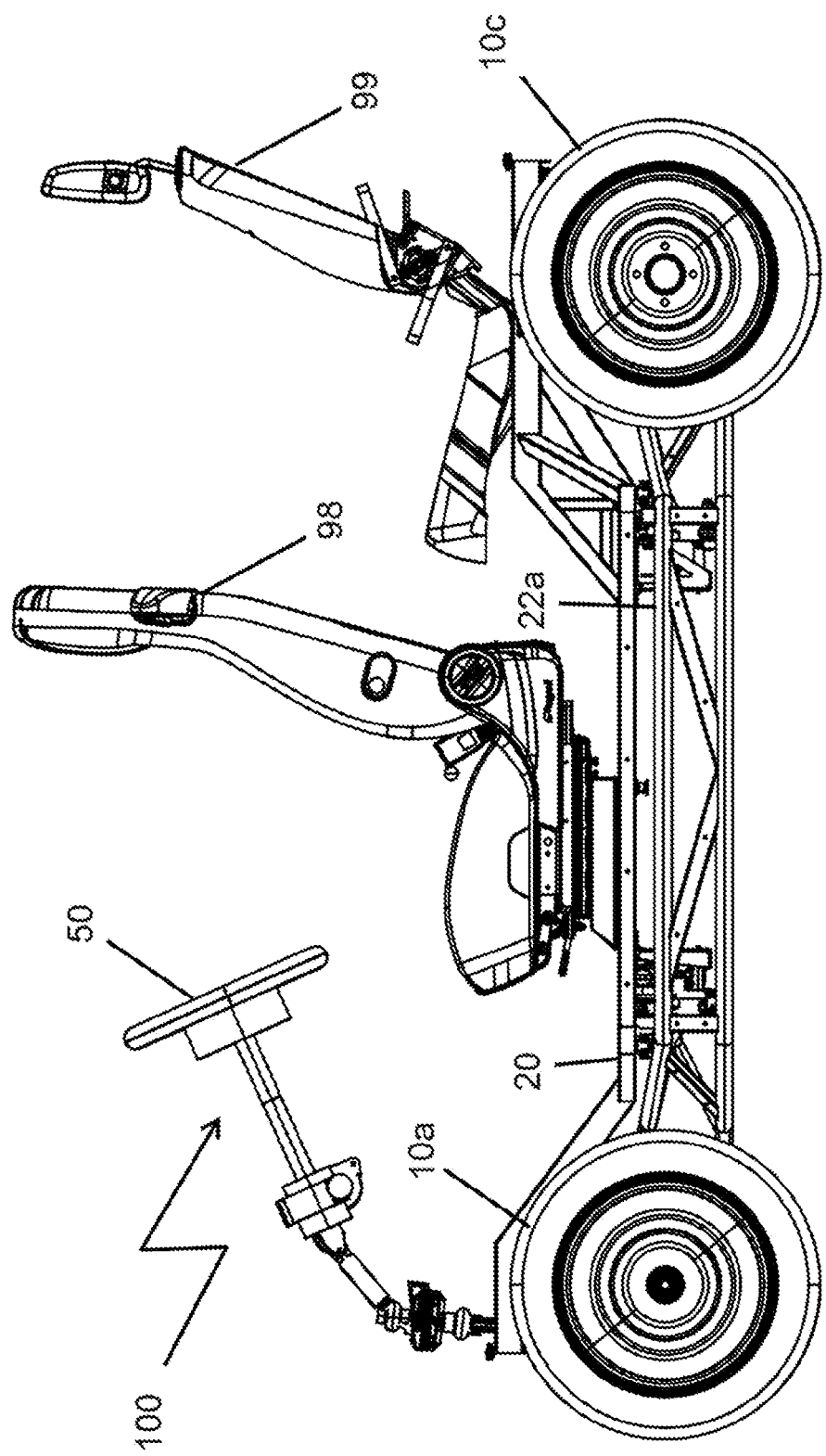
FIG. 3 is a side view of a foldable vehicle with seats, showing some parts of the vehicle, in accordance with some embodiments of the present invention.

FIG. 3 is a side view of a chassis of a foldable vehicle with seats, in accordance with some embodiments of the present invention. Vehicle 100 may have one or a plurality of front seats 98 and may have one or a plurality of back seats 99. Vehicle 100 may have a plurality seats in a plurality arrangements. For example, Vehicle 100 may have 3 rows of seats with two chairs in each row. During the folding and unfolding of vehicle 100 seat 98 may remain at a constant distance from steering wheel 50. The steering wheel 50 may be rotated and remain at a desired rotated position during the folding or unfolding of vehicle 100.

Figure 4:
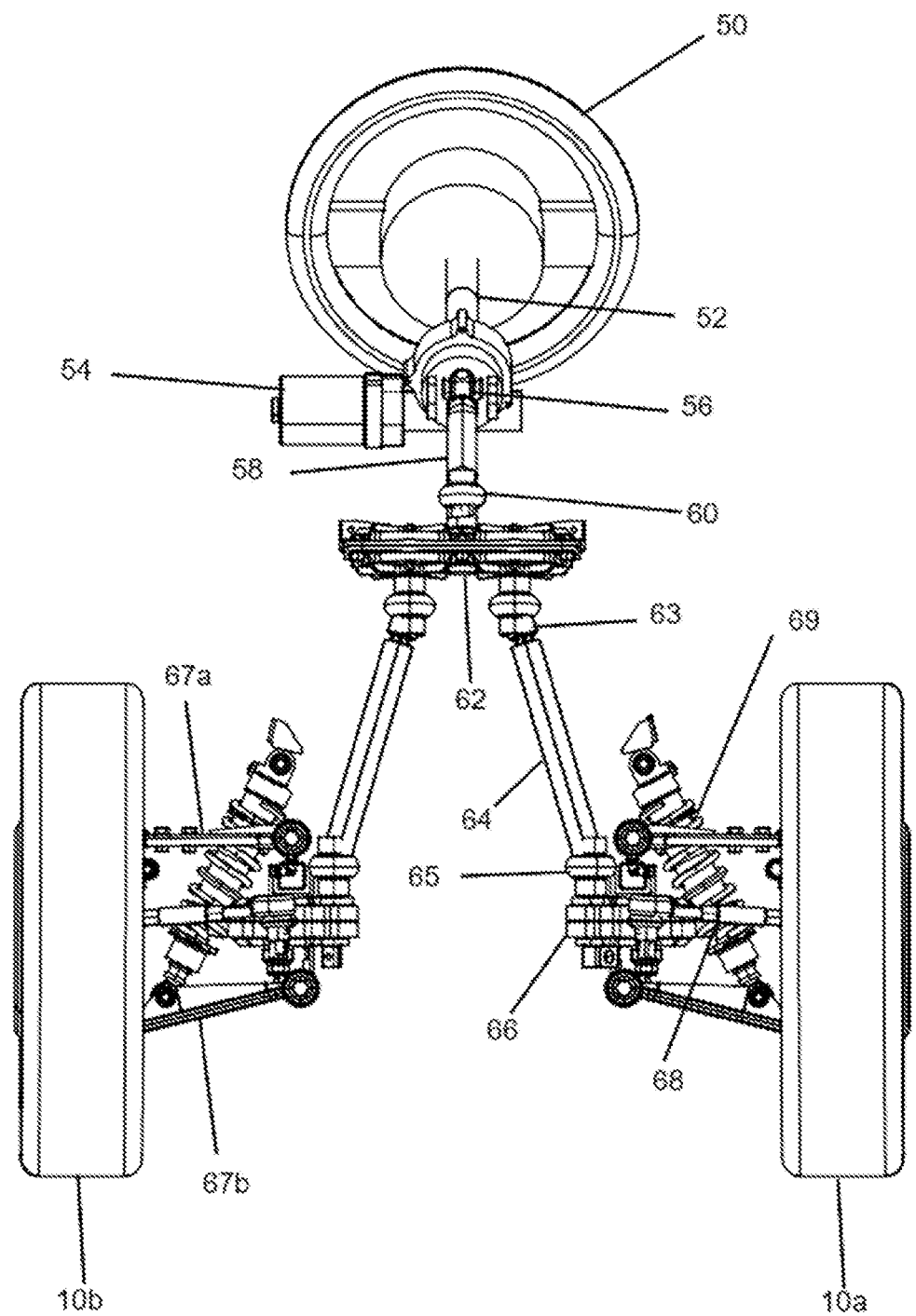
FIG. 4 is a frontal view of a split steering mechanism connected to front wheels of a foldable vehicle, in accordance with some embodiments of the present invention.

FIG. 4 is a frontal view of a split steering mechanism connected to the front wheels of a foldable vehicle, in accordance with some embodiments of the present invention. Steering wheel 50 may be connected to steering column 52.

Steering assembly 54 and/or steering column 52 may be connected through universal joint 56 to shaft 58 that transmits the turning motion of steering wheel 50 onward to gearbox 62 through universal joint 60.

Gearbox 62 may connect to each of two opposite extendable shafts 64 via universal joint 63. Each extendable shaft 64 may connect to lever gear 66 of either of the wheels via universal joint 65. Gearbox 62 may be configured to covert rotation of steering wheel 50 to wheels 10a and 10b through each of the two extendable shafts 64. Extendable shafts 64 may extend and retract with the unfolding and folding of the vehicle while facilitating the turning of wheels 10a and 10b at an angle when the vehicle is in the folded or unfolded state, or in an intermediate state. Gearbox 62 may be configured to convert the rotation of steering wheel 50 to wheels 10a and 10b while maintaining the Ackerman angle between wheels 10a and 10b. Suspension 69 may suspend wheel 10a (and other wheels) to frame 22a. In some embodiments of the present invention shafts 64 may not be extendable, the steering system may be a split steering system. For example, shafts 64 may have constant length. Shafts 64 may have a constant length and adjust for Ackerman angle and/or keep a turn angle of the front wheels of the vehicle. For example, a split steering system may be useful in small, micro-cars with the shafts having a constant length. The split steering system may allow space for the feet of the driver and any other front passenger.

Figure 6:
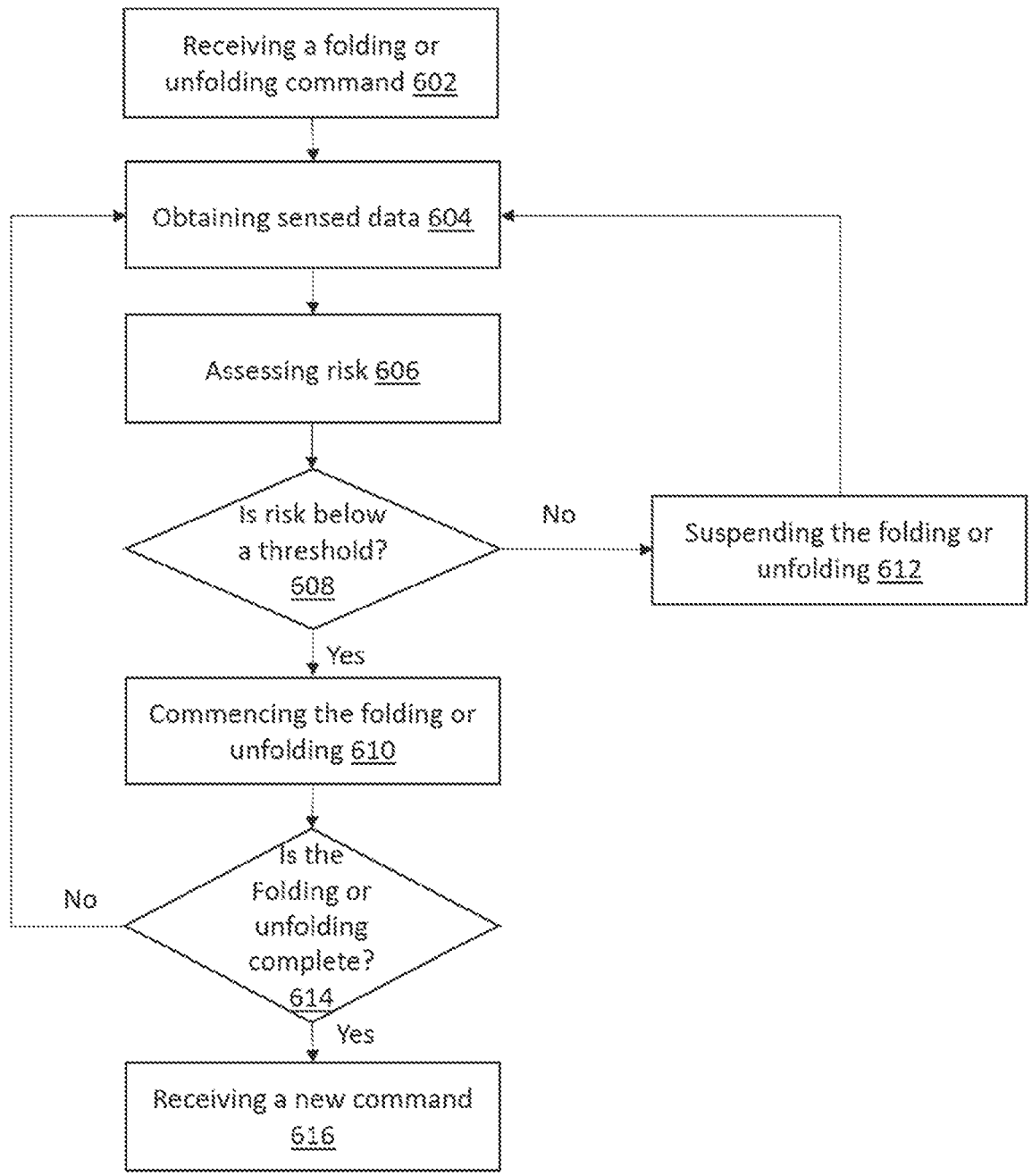
FIG. 6 is a flowchart of a method of controlling the folding and unfolding process of a foldable vehicle, in accordance with some embodiments of the present invention.

FIG. 6 is a flowchart of a method for folding and unfolding of a foldable vehicle, in accordance with some embodiments of the present invention. The method of the folding and unfolding may involve using a controller. The controller may receive a folding or unfolding command 602. For example, the controller may receive a command for folding or unfolding the vehicle from a user of the vehicle, such as the driver. Additionally, the controller may generate or receive a folding or unfolding command. For example, if the folding vehicle is autonomous, the controller may generate and/or receive a folding or unfolding command autonomously. The folding or unfolding method includes obtaining sensed data 604 (e.g., measurements and signals) from one or more sensors (e.g. sensors located on the vehicle, and/or external sensors) for sensing parameters associated with assessing risk to the vehicle, both external to the vehicle and internal to the vehicle, that may hinder the folding or unfolding process. For example, the controller may obtain sensed data from one or more proximity sensors, so as to evaluate the risk of colliding with a near obstacle, one or more acceleration sensors (e.g., gyro sensor) to identify risky maneuver or dangerous acceleration, one or more velocity sensors to identify dangerous speeds, one or more imaging sensors (e.g., camera, lidar) for obtaining an image of a proximal vicinity of the vehicle and processing the image to identify risks, one or more location sensors (e.g., GPS sensor) and any other one or more sensors for measuring data regarding the extent of folding and unfolding and any associated potential risk. The controller may obtain sensed data for assessing risk.

The controller may assess risk 606 related to the folding and unfolding. The risk may be assessed by assessing if the sensed data is within predetermined limits. For example, the controller may assess if the velocity of the foldable vehicle is within a non-risky range (e.g., between 5.38 Km/h and 40 Km/h). The controller may assess if the vehicle is making a sharp acceleration or deceleration. The controller may assess if the foldable vehicle is in a location that is not safe for folding or unfolding. The controller may assess a risk of acceleration related to folding and unfolding during a sharp turn.

To assess risk (e.g., combined risk), the controller may have a combined risk assessment where the controller may combine risk assessments categories. The controller may assess if in each risk assessment category (e.g., velocity, acceleration, proximity to other vehicles) the risk is below a threshold. The controller may have a pass/fail criteria for each risk assessment category. The controller may assess the combined risk by checking if at least one of the risk assessment categories yields a risk above a threshold. The controller may assess risk by assigning a risk index (e.g., value of assessed risk) for each risk assessments category. The controller may assess the combined risk by combining the risk indexes of the risk assessment categories.

The controller may receive a command for folding and unfolding the vehicle from another device (e.g., car computer, safety controller, autonomous control unit) or a remote device (e.g., a remote computer, cloud system, remote monitoring system, remote control system, autonomous driving remote control etc.). The controller may also generate a folding or unfolding command in one or more certain situations (e.g., an unfolding command when the speed of the vehicle is approaching a predetermined speed limit threshold). According to some embodiments of the present invention, the controller may be configured to resolve conflicts between conflicting commands. For example, if the controller receives a command from a user (e.g., the driver) to commence folding of the vehicle, and at the same time the folding mechanism is executing an unfolding command the controller may be configured to resolve the conflict between the conflicting commands, according to a conflict resolution rule or set of rules. The controller may be configured to assess risk, priority, safety, car conditions, system state, car surroundings, road conditions, velocity, acceleration and other factors, and resolve conflicts between received and/or generated commands based on the assessed risk.

The controller may check if the risk is below a threshold 608. For example, the controller may check if the risk assessment categories are below a threshold. The controller may check if the combined risk assessment is below a threshold.

If the risk is below a threshold, the controller may commence folding or unfolding 610. The controller may be configured to give feedback to user/s of the vehicle and/or to other party (e.g., another computing system, a remote computer, autonomous controller) regarding various aspects and steps. For example, the controller may be configured to cause an indication to be presented to the driver as to whether the vehicle is performing folding or unfolding. The controller may be configured to cause an indication to be presented to the driver or to a third party (e.g., device, software, cloud controller, server, etc.) that there is risk preventing the initiation of the folding or unfolding process. The controller may be configured to cause an indication to be presented to the driver that the folding or unfolding process has been suspended. The controller may be configured to cause an indication to be presented to the driver that the folding or unfolding process has completed. The controller may be configured to provide feedback regarding the folding position of the vehicle. For example, the controller may cause an indication to be presented to the driver indicating that the vehicle is in the folded state, in the unfolded state or in an intermediate position between the folded state and the unfolded state.

If the risk is not below a threshold 608, the controller may suspend the folding or unfolding 612. For example, the controller may delay, pause, cancel and ignore the received command for folding or unfolding 602. After the controller suspended the folding or unfolding 612, the controller may go back to steps 604-608 until the risk is below a threshold.

The controller may check if the folding or unfolding is complete 614. If the folding or unfolding is not complete, the controller may go back to obtaining sensed data 604, assessing risk 606 and checking is the risk below a threshold 608 (repeating steps 604-608). For example, if during the folding and unfolding the risk is not below a threshold, the controller may suspend the folding or unfolding until the risk is below a threshold. During the folding or unfolding, the controller may repeat obtaining sensed data 604, assessing risk 606 and checking is the risk below a threshold 608 until the folding or unfolding is compete. For example, if the risk is not below a threshold 608, the controller may suspend the folding or unfolding 612 and repeat 604-608 until the risk is below a threshold. When the risk is below a threshold 608, the controller may commence the folding or unfolding 610, until the folding or unfolding is complete.

If the folding or unfolding is complete 614, the controller may receive a new command 616 for folding or unfolding. When a new command is received, the controller may go to step 602 and continue to step 604 and so on.

The controller may receive a new command during the folding or unfolding (e.g., during step 610). The controller may be configured to resolve conflict between folding and unfolding commands. For example, during any of steps 604-614 the controller may ignore or suspend any new commands, until the folding or unfolding are complete.

In some embodiments of the present invention, the foldable vehicle may have a locking mechanism, the controller may operate said locking mechanism once the folding is complete, so as to lock the vehicle in the folded state or the unfolded state. In some embodiments of the present invention the locking mechanism, may lock the vehicle in a position between the folded state and the unfolded state (e.g., if the controller suspended the folding or unfolding until the risk is below a threshold).

In some embodiments of the present invention, the folding and unfolding may be automated. For example, upon reaching a predetermined speed, the foldable vehicle may automatically unfold. In some embodiments of the present invention, the foldable vehicle may be configured to suspend the folding and unfolding of the foldable vehicle. For example, a sharp turn of the vehicle (e.g., the user of the vehicle turned the steering fast) may lead the foldable vehicle to suspend the folding and unfolding of the foldable vehicle. Additionally, upon excessive acceleration and deceleration, the foldable vehicle may suspend the folding and unfolding. In some embodiments of the present invention, during a panic steering (e.g., an unexpected maneuver) or during an emergency brake, the folding mechanism may stop the folding and unfolding of the foldable vehicle and lock the folding mechanism.

Figure 5:
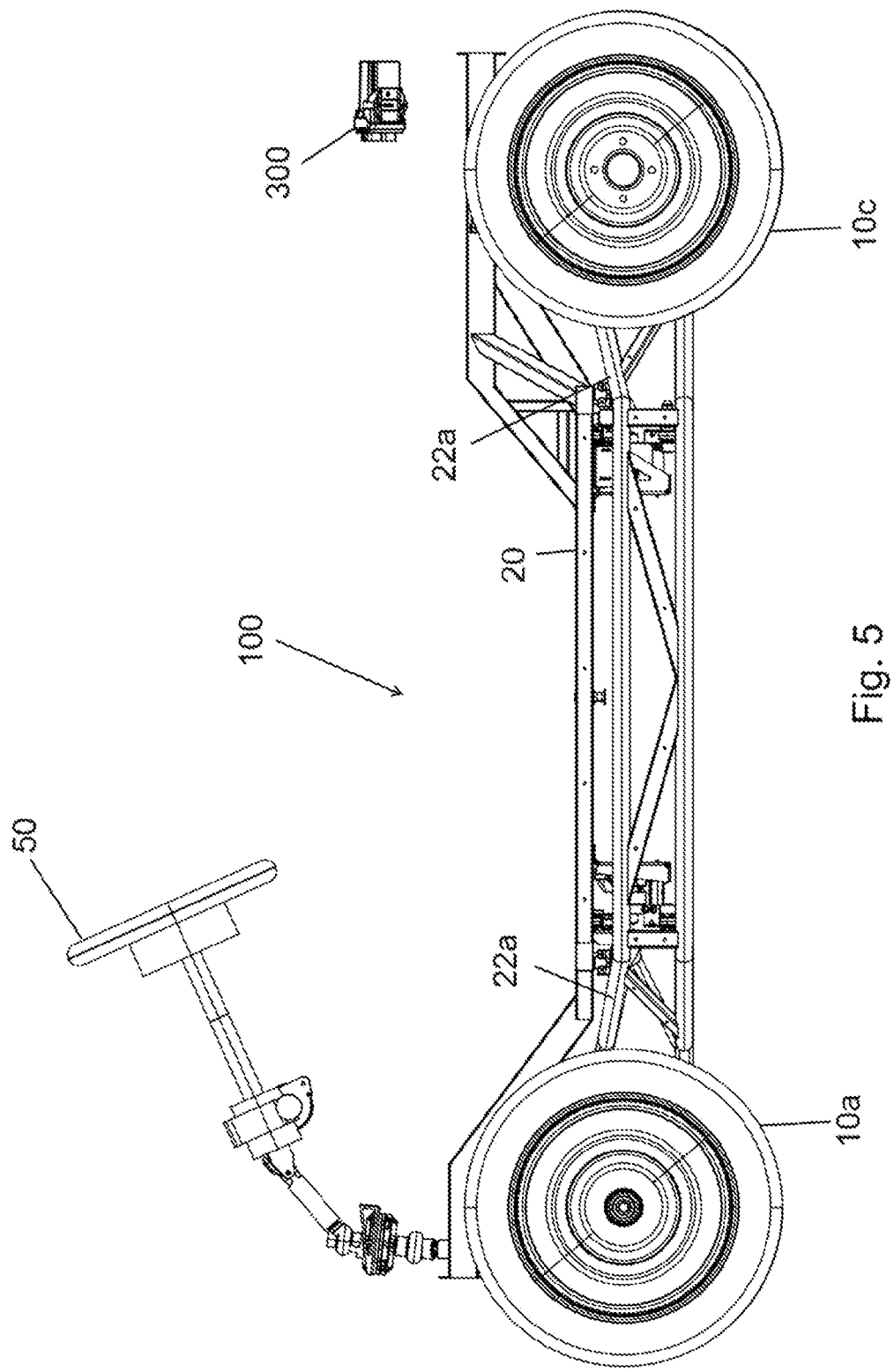
FIG. 5 is a side view of a chassis of a foldable vehicle with a controller, in accordance with some embodiments of the present invention.

FIG. 5 shows a side view of a chassis of a foldable vehicle with a controller, in accordance with some embodiments of the present invention. Foldable vehicle 100 may include controller 300. Controller 300 may be configured to control the folding and unfolding of vehicle 100. Foldable vehicle 100 may include one or a plurality of sensors. Controller 300 may connect to the sensors. Controller 300 may read measurements from the sensors.

Controller 300 may assess based on measurements form the sensors risk factors associated with folding or unfolding vehicle 100. For example, controller 300 may read measurements from sensors for assessing if another vehicle is too close to foldable vehicle 100 so that if foldable vehicle 100 would unfold, foldable vehicle 100 might crash into the vehicle close to foldable vehicle 100, additionally, controller 300 may read measurements from sensors regarding acceleration and determine that vehicle 100 undergoing a turn at high acceleration which would be risky.

Controller 300 may decide based on the calculated risk factor whether to commence the folding and unfolding of vehicle 100. For example, if the risk factor is high, controller 300 may prevent the folding or unfolding from being initiated, additionally, if controller 300 detects a high risk during the folding or unfolding of vehicle 100, controller 300 may suspend the folding or unfolding in an intermediate position, controller 300 may commence the folding or unfolding after the risk had subsided.

Controller 300 may assess based on measurements form the sensors limitations associated with folding or unfolding of vehicle 100. For example, controller 300 may read the velocity of vehicle 100 and decide if to initiate unfolding (e.g., when the velocity is approaching 40 Km/h during acceleration).

In some embodiments of the present invention, the controller may obtain data regarding road conditions and the friction between the wheels and the road. The controller may adjust an upper limit of velocity of the vehicle in the folded state. Obtained data regarding the road conditions and the traction of the wheels may yield a risk assessment above a threshold. The controller may lower the limit of allowed vehicle velocity (e.g., the vehicle may drive up to 30 Km/h instead of 40 Km/h in the folded state). The controller may adjust parameters of the foldable vehicles according to the obtained data. For example, if the road conditions are bad, the controller may adjust the parameters of the brake pedals and acceleration pedals to account for the road conditions. In some embodiments of the present invention, the controller may change the speed of the vehicle (or motor) and parameters of the brakes in order to compensate for road conditions (e.g., if there's a different traction or friction coefficient difference between the left and the right wheels to the road).

In some embodiments of the present invention, the controller may have a manual mode and an automatic mode. In the manual mode, the controller may receive commands from a user of the foldable vehicle to fold and unfold the foldable vehicle. For example, in the manual mode a user may press a button for folding or unfolding the foldable vehicle. In the automatic mode, the foldable vehicle may continuously collect and analyze data from sensors, and generate automatically to fold or unfold the foldable vehicle.

Figure 7:
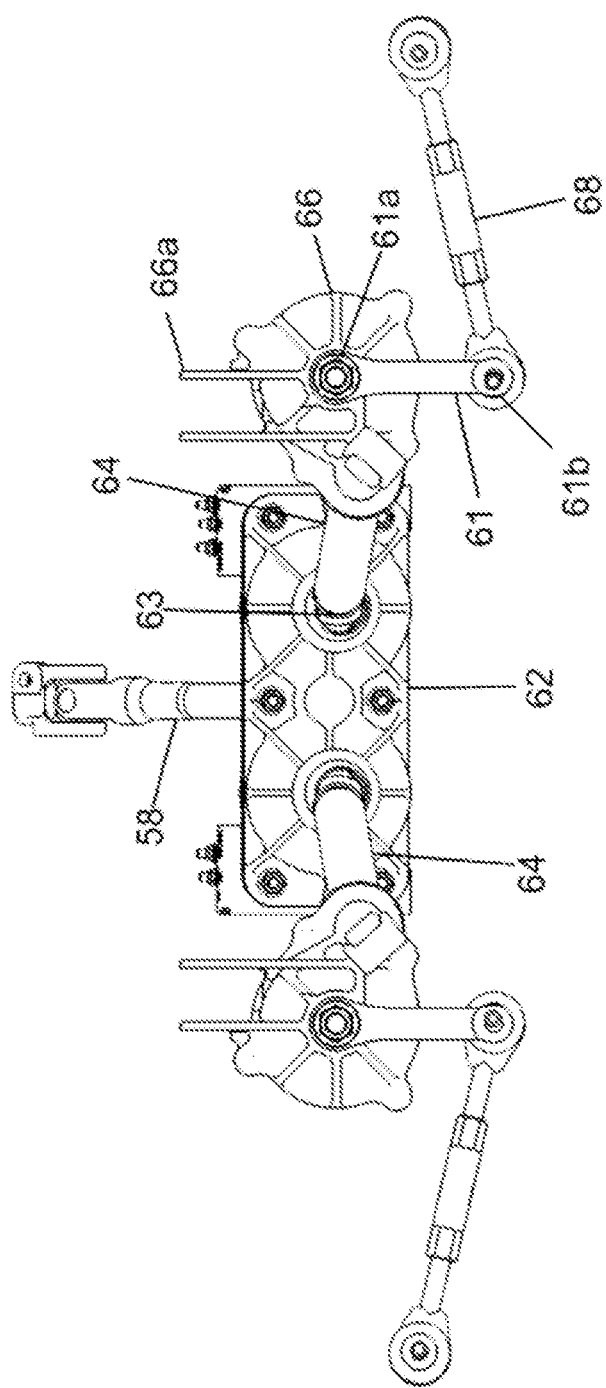
FIG. 7 is a bottom view of a split steering mechanism, in accordance with some embodiments of the present invention.

FIG. 7 is a bottom view of a split steering mechanism, in accordance with some embodiments of the present invention. The split steering mechanism may include gearbox 62. Gearbox 62 may be connectable to a steering wheel by steering column 58. The split steering mechanism may include two shafts 64 connected to gearbox 62. Gearbox 62 may include a central gear connected to steering column and two peripheral gears connected to the shafts. The central gear may transmit and split rotation of the central gear to rotation of the peripheral gears. A first shaft of the two shafts 64 may link the gearbox 62 to a first front wheel of a vehicle, and a second shaft of the two shafts 64 may link the gearbox 62 to a second front wheel of the vehicle. The gearbox 62 may be configured to transmit and split rotation of steering column 58 to rotation of the shafts 64, so that the rotation of each of the shafts 64 substantially correlates (e.g., is substantially identical) to the rotation of the steering column 58. Shaft 64 may connect to lever gear 66.

In some embodiments of the present invention lever gear 66 may be connected to a frame part of the vehicle (e.g., connected to one of two substantially opposite frame parts) with protruding element 66a. Levers 66 may move apart when the foldable vehicle unfolds. Levers 66 may move closer together when the foldable vehicle folds. Lever gear 66 may connect to lever 61 with lever first joint 61a. Lever gear 66 may include two gears, a first gear connected to shaft 64 and a second gear connecting lever first joint 61a. Lever gear 66 may transmit rotation of shaft 64 (through the first gear and the second gear) to lever 61 so that when the steering wheel is rotated, lever 61 may rotate. For example, lever 61 may rotate in a direction opposite to a rotation direction of the steering wheel.

In some embodiments of the present invention lever 61 may connect lever gear 66 to tie shaft 68 with lever second joint 61b. When lever 61 is rotated, tie shaft 68 may turn a front wheel of the vehicle. For example, when the vehicle is in the folded state, lever gear 66 may remain static (e.g., connected to a frame part with protruding element 66a), a rotation of steering column 58 may rotate lever gear 61 so as to move tie shaft 68 (e.g., in accordance with Ackermann correction), tie shaft 68 may change a turn angle of a front wheel of the vehicle.

Typically, vehicles where a steering rod is connected in front of an axis between front wheels of the vehicle, the front wheels may be turned at angles that do not comply with Ackerman correction (e.g., reverse Ackerman). In some embodiments of the present invention, lever 61 connecting tie shaft 68, wherein tie shaft 68 is connected in front of an axis between front wheels of the vehicle, may apply Ackerman correction. Lever gears 61, tie shafts 68 and the front wheels may be positioned along a virtual rectangle that conforms with Ackerman correction. Dimensions (and angles) of the virtual rectangle may conform with a length of lever 61, a length of tie shaft 68, a distance between front wheels of the vehicle and other dimensions of the vehicle, in order to apply Ackerman correction.

In some embodiments of the present invention, a length of lever 61 and of tie shaft 68 may be determined according to Ackerman correction. Lever 61 may be extend from lever gear 66 towards a proximal direction of the vehicle (e.g., front of the vehicle). Lever 61 may be positioned forward of an axis between front wheels of the vehicle (e.g., closer towards a front of the vehicle). The length of lever 61 may be determined according to the distance between front wheels of the vehicle and other dimensions of the vehicle (e.g., a length of the vehicle, distance of front wheels of the vehicle form a center of the vehicle, etc.). The length of lever 61 may be determined according to Ackerman correction when the vehicle is in the folded state. The length of lever 61 may be determined according to Ackerman correction when the vehicle is in the unfolded state. The length of lever 61 may be determined according to Ackerman correction depending on any state between the folded state and the unfolded state. For example, The length of lever 61 may be determined according to a mathematical average of the distance between front wheels of the vehicle, in the folded state and the unfolded state.

In some embodiments of the present invention, a vehicle (e.g., a small vehicle, micro vehicle) may have a split steering system. The split steering system may adjust the front wheels for Ackerman correction. The split steering system may turn the front left wheel at a first turn angle and the front right wheel in a second, different turn angle to adjust for Ackerman correction. Typically, in small and micro vehicles, there's not much space for the feet of the driver. The split steering system may provide precious space, e.g., space for the feet of the driver and a front passenger.

In some embodiments of the present invention, the split steering system may adjust according to a vehicle's width (e.g., folding and unfolding) and/or according to the vehicle's height. The vehicle may adjust the height of thereof, the split steering system may keep the turn angle of the wheels in different heights of the vehicle. For example, the split steering system may keep the turn angle of the wheels before, during and after a height adjustment of the vehicle or any of the wheels. The split steering system may keep the turn angle of the wheels, while tolerating differences in height between different sides of the vehicle.

In some embodiments of the present invention, the split steering system may adjust the front wheels for Ackerman correction in relation to the height of the vehicle and/or any of the wheels of the vehicle. For example, the split steering system may adjust the front wheels for Ackerman correction if the height of one side of the vehicle is different than another side of the vehicle. The split steering system may adjust the front wheels for Ackerman correction if the height of at least one of the wheels (e.g., one of the front wheels) is different than another wheel (e.g., one wheel is higher and all other wheels are on the same height). For example, the split steering system may adjust the front wheels for Ackerman correction before, during and after a height adjustment of the vehicle or any of the wheels. The split steering system adjust the front wheels for Ackerman correction, while tolerating differences in height between different sides of the vehicle.

In some embodiments of the present invention, a split steering mechanism may include a gearbox connectable to a steering wheel by a steering column, split steering mechanism may include two shafts, a first shaft of the two shafts for linking the gearbox to a first front wheels of a vehicle, and a second shaft of the two shafts for linking the gearbox to a second front wheel of the vehicle. The gearbox may be configured to transmit and split rotation of the steering column to rotation of the shafts, so that the rotation of each of the shafts correlates (e.g., is substantially identical) to the rotation of the steering column. For example when the user of the vehicle rotates the steering wheel, the rotational motion is transferred to the gearbox, wherein the gearbox may be configured to transmit and split the rotation of the steering column to rotation of the shafts.

In some embodiments of the present invention, the split steering mechanism may be configured to facilitate a varying length of each of the shafts. For example, the shafts may be telescopic, the length of the shafts may vary according to a height of a wheel and/or a width of the vehicle. The split steering mechanism may change the turn angle of the wheels while facilitating varying lengths of each of the shafts.

In some embodiments of the present invention, the split steering mechanism may be configured to facilitate concurrent different lengths of the shafts. If one of more wheels of the vehicle are at a different height than the rest of the wheels (e.g., the vehicle is parked on a curb, a front wheel of the vehicle is elevated, the vehicle is ascending an uneven ramp, etc.), a length of the first shaft may be different than the length of the second shaft. The split steering mechanism may be configured to facilitate different lengths of the shafts when one of more wheels of the vehicle are at a different height than the rest of the wheels. If a frame part of the vehicle extends at a different rate or to a different extent than the other frame part, a length of the first shaft may be different than the length of the second shaft. The split steering mechanism may be configured to facilitate different lengths of the shafts when the frame parts of the vehicle have concurrent different distances from a center of the vehicle.

In some embodiments of the present invention, the split steering mechanism may be configured to apply Ackerman correction when turning the front wheels.

In some embodiments of the present invention, a foldable vehicle may include a split steering mechanism comprising a gearbox connectable to a steering wheel by a steering column. The split steering mechanism may also include two shafts, a first shaft of the two shafts for linking the gearbox to a first front wheels of a vehicle, and a second shaft of the two shafts for linking the gearbox to a second front wheel of the vehicle. The gearbox may be configured to transmit and split rotation of the steering column to rotation of the shafts, so that the rotation of each of the shafts correlates (e.g., is substantially identical) to the rotation of the steering column.

Different embodiments are disclosed herein. Features of certain embodiments may be combined with features of other embodiments. Thus, certain embodiments may be combinations of features of multiple embodiments. The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A method for controlling folding and unfolding of a foldable vehicle using a controller, the method comprising:
   using the controller, receiving a folding or unfolding command;
   using the controller, obtaining sensed data from one or more sensors located on the vehicle for sensing parameters associated with assessing risk to the vehicle;
   using the controller, assessing the risk;
   using the controller, checking whether the risk is below a threshold;
   using the controller, commencing the folding or unfolding if the risk is below a threshold;
   using the controller, checking whether the folding or unfolding is complete; and
   if the folding or unfolding is not complete, obtaining sensed data from the one or more sensors, assessing the risk and checking whether the risk is below a threshold until the folding or unfolding is complete.

2. The method of claim 1, further comprising suspending the folding or unfolding of the foldable vehicle if the risk is not below a threshold.

3. The method of claim 2, further comprising, after suspending the folding or unfolding, obtaining sensed data from the one or more sensors, assessing the risk and checking whether the risk is below a threshold.

* * * * *